United States Patent
Tang et al.

(10) Patent No.: US 10,999,404 B2
(45) Date of Patent: May 4, 2021

(54) METHOD, APPARATUS AND SYSTEM FOR SON COORDINATION DEPENDING ON SON FUNCTION PRIORITY

(71) Applicant: NOKIA SOLUTIONS AND NETWORKS OY, Espoo (FI)

(72) Inventors: Haitao Tang, Espoo (FI); Kaj Peter Stenberg, Sundsberg (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 458 days.

(21) Appl. No.: 15/506,870

(22) PCT Filed: Aug. 29, 2014

(86) PCT No.: PCT/EP2014/068427
§ 371 (c)(1),
(2) Date: Feb. 27, 2017

(87) PCT Pub. No.: WO2016/029969
PCT Pub. Date: Mar. 3, 2016

(65) Prior Publication Data
US 2017/0244806 A1 Aug. 24, 2017

(51) Int. Cl.
*H04W 84/22* (2009.01)
*H04L 29/08* (2006.01)
(Continued)

(52) U.S. Cl.
CPC ........... *H04L 67/322* (2013.01); *H04W 84/18* (2013.01); *H04W 24/02* (2013.01)

(58) Field of Classification Search
CPC . H04W 4/008; H04W 72/0446; H04W 40/12; H04W 4/02; H04W 36/30;
(Continued)

(56) References Cited

U.S. PATENT DOCUMENTS

| 2013/0242720 A1 | 9/2013 | Chou |
| 2014/0040450 A1* | 2/2014 | Sanneck .............. H04L 41/04 709/223 |
| 2015/0043386 A1* | 2/2015 | Racz .................... H04L 41/044 370/255 |

OTHER PUBLICATIONS

International Search Report & Written Opinion dated May 29, 2015 corresponding to International Patent Application No. PCT/EP2014/068427.

(Continued)

*Primary Examiner* — Tu X Nguyen
(74) *Attorney, Agent, or Firm* — Squire Patton Boggs (US) LLP

(57) ABSTRACT

There is provided a method comprising receiving at least one request from a first function instance of a self-organising network, comparing said first function instance and a second function instance effective in the self-organising network to determine whether the first function instance and the second function instance overlap, and, characterised by, receiving operational stage information of the first function instance and if the first function instance and the second function instance overlap using said operational stage information in determining which of the first and second function instance to nm in dependence on which of the first function instance and the second function instance has higher priority and causing the determined instance to be run.

24 Claims, 10 Drawing Sheets

(51) Int. Cl.
*H04W 84/18* (2009.01)
*H04W 24/02* (2009.01)

(58) Field of Classification Search
CPC ..... H04W 48/16; H04W 72/04; H04W 72/10; H04W 28/0236; H04W 28/08; H04W 72/1215; H04W 28/0289; H04W 28/042
USPC ........................................ 455/509, 512, 516
See application file for complete search history.

(56) References Cited

OTHER PUBLICATIONS

Huawei et al: "Common SON coordination solution," 3GPP Draft; S5-121302 CR R11 32.522 Common SON Coordination Solutions, 3GPP TSG-SA5 Meeting #83, Sarajevo, Bosnia & Herzegovina, May 11, 2012, XP050647583.

Zwi Altman et al.: "On design principles for self-organizing network functions," 2014 11th International Symposium on Wireless Communications Systems (ISWCS), IEEE, Aug. 26, 2014, pp. 454-459.

\* cited by examiner

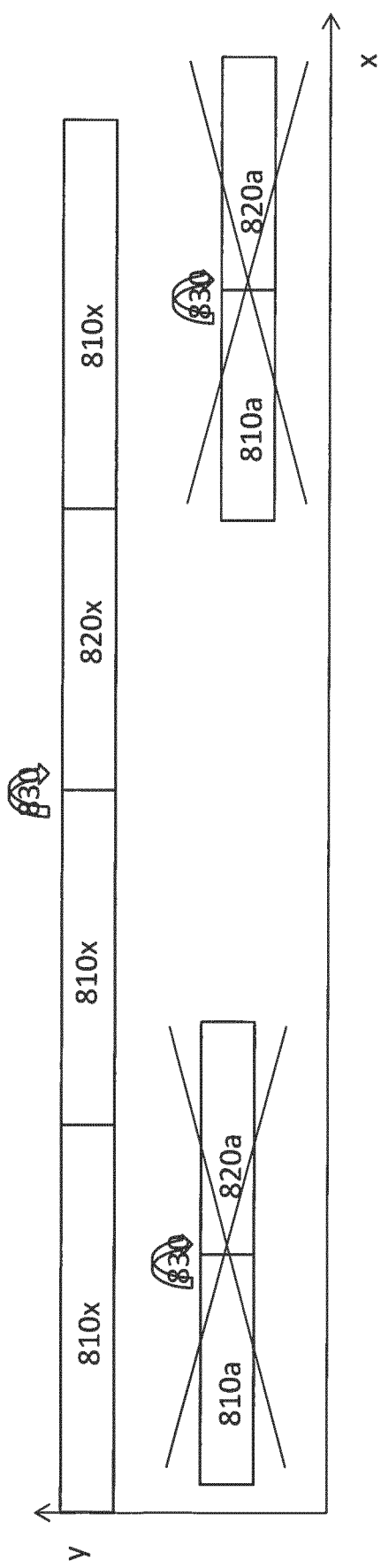

METHOD, APPARATUS AND SYSTEM FOR SON COORDINATION DEPENDING ON SON FUNCTION PRIORITY

FIELD

The present application relates to a method, apparatus and system and in particular but not exclusively, self-organising networks (SON).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases.

SUMMARY OF EMBODIMENTS

In a first embodiment there is provided a method comprising receiving at least one request from a first function instance of a self-organising network, comparing said first function instance and a second function instance effective in the self-organising network to determine whether the first function instance and the second function instance overlap, and, characterised by, receiving operational stage information of the first function instance and, if the first function instance and the second function instance overlap, using said operational stage information in determining which of the first and second function instance to run in dependence on which of the first function instance and the second function instance has higher priority and causing the determined instance to be run.

A function may thus be aware of the operational stage of the function instance making the request.

This may provide a method of coordinating function instances of a self-organising network according to their different operational stage and by doing so may reduce dominance of those instances with longer and/or bigger impacts.

The method may comprise using said operational stage information to determine whether said request is for an input operation stage.

This may allow the method to decide whether to assess input scope or impact area of a function when determining whether a first function instance overlaps with a second function instance.

The method may comprise, if the request is not for input collection, comparing said first and second function instance to determine if the first and second function instance overlap comprises determining if output impact time and impact area of the first function instance and output impact time and impact area of the second function instance overlap.

Thus the method takes into account the effects of still effective but not visible function instance in the system.

The method may comprise comparing an effective priority for the operational stage of the first function instance and an effective priority for the operational stage of the second function instance.

Thus the coordination of function instances may take into account how the priority of an instance may change during the operation of the instance.

Effective priority may be dependent on absolute priority for the function instance.

The method may comprise, if the request is for an input operation stage, determining if input impact time and scope of the first function instance and output impact time and impact area of the second function instance overlap.

It can thus be determined if a function instance is effective in the system which may affect performance management for a new function instance.

The method may comprise, determining that the first function instance has lower priority than the second function instance if the input impact time and scope of the first function instance and the output impact time and impact area of the second function instance overlap.

This may avoid triggering of new function instances based on unreliable or inconstant performance management data collected during the input collection period.

Running a function instance may comprise updating operational stage information.

The operational stage information of a function instance may thus be indicated to a coordination function.

The method may comprise updating operational stage information after a predetermined time period.

Operational stage information for implicit stages effective in the system may thus be updated.

The method may comprise receiving configuration management information and updating operational stage information upon receipt of said configuration management information.

The system may use the indication of configuration management information to update operational stage information.

Configuration management information may be at least one of a verification result and operational proposal.

The method may comprise determining which of the first and second function instance to run upon receipt of the at least one request.

That is, the method may operate in an event mode whenever it receives a request for a function instance.

The method may comprise receiving a plurality of requests from at least one first function instance in a first time period and determining which of the at least one first function instance and second function instance to run at the end of the first time period.

That is, the function may operate in batch mode where it collects requests in a certain time period before making approval decisions. The function may also wait until it has received a certain number of requests before making a decision for each request.

The method may comprise storing at least one of operational stage information and priority information for a function instance in at least one of the function instance, a database storage function and a coordination function.

The coordination function may then obtain the information when needed.

Running the determined function instance may comprise continuing the determined function instance to an output operation stage.

Thus the inputs needed for correct execution may be allowed to be collected.

In a second embodiment there is provided an apparatus, said apparatus comprising means for receiving at least one request from a first function instance of a self-organising network, means for comparing said first function instance and a second function instance effective in the self-organising network to determine whether the first function instance and the second function instance overlap, and, characterised in that the apparatus comprises, means for receiving operational stage information of the first function instance and means for, if the first function instance and the second function instance overlap, using said operational stage information in determining which of the first and second function instance to run in dependence on which of the first function instance and the second function instance has higher priority and means for causing the determined instance to be run.

The apparatus may comprise means for using said operational stage information to determine whether said request is for an input operation stage.

The apparatus may comprise means for, if the request is not for input collection, comparing said first and second function instance to determine if the first and second function instance overlap which may comprise means for determining if output impact time and impact area of the first function instance and output impact time and impact area of the second function instance overlap.

The apparatus may comprise means for comparing an effective priority for the operational stage of the first function instance and an effective priority for the operational stage of the second function instance.

Effective priority may be dependent on absolute priority for the function instance.

The apparatus may comprise means for, if the request is for an input operation stage, determining if input impact time and scope of the first function instance and impact time and impact area of the second function instance overlap.

The apparatus may comprise means for determining that the first function instance has lower priority than the second function instance if the input impact time and scope of the first function instance and the output impact time and impact area of the second function instance overlap.

Running a function instance may comprise updating operational stage information.

The apparatus may comprise means for updating operational stage information after a predetermined time period.

The apparatus may comprise means for receiving configuration management information and means for updating operational stage information upon receipt of said configuration management information.

Configuration management information may be at least one of a verification result and operational proposal.

The apparatus may comprise means for determining which of the first and second function instance to run upon receipt of the at least one request.

The apparatus may comprise means for receiving a plurality of requests from at least one first function instance in a first time period and means for determining which of the at least one first function instance and second function instance to run at the end of the first time period.

The apparatus may comprise means for storing at least one of operational stage information and priority information for a function instance in at least one of the function instance, a database storage function and a coordination function.

The apparatus may comprise means for running the determined function instance which may comprise means for continuing the determined function instance to an output operation stage.

In a third embodiment there is provided an apparatus, said apparatus comprising at least one processor and at least one memory including computer program code, the at least one memory and the computer program code configured to, with the at least one processor, cause the apparatus at least to receive at least one request from a first function instance of a self-organising network, compare said first function instance and a second function instance effective in the self-organising network to determine whether the first function instance and the second function instance overlap, and, characterised in that the apparatus is configured to, receive operational stage information of the first function instance and, if the first function instance and the second function instance overlap, use said operational stage information in determining which of the first and second function instance to run in dependence on which of the first function instance and the second function instance has higher priority and cause the determined instance to be run.

The apparatus may be configured to use said operational stage information to determine whether said request is for an input operation stage.

The apparatus may be configured to, if the request is not for input collection, determine if output impact time and impact area of the first function instance and output impact time and impact area of the second function instance overlap.

The apparatus may be configured to compare an effective priority for the operational stage of the first function instance and an effective priority for the operational stage of the second function instance.

Effective priority may be dependent on absolute priority for the function instance.

The apparatus may be configured to, if the request is for an input operation stage, determine if input impact time and scope of the first function instance and output impact time and impact area of the second function instance overlap.

The apparatus may be configured to determine that the first function instance has lower priority than the second function instance if the input impact time and scope of the first function instance and the output impact time and impact area of the second function instance overlap.

Running a function instance may comprise updating operational stage information.

The apparatus may be configured to update operational stage information after a predetermined time period.

The apparatus may be configured to receive configuration management information and update operational stage information upon receipt of said configuration management information.

Configuration management information may at least one of a verification result and operational proposal.

The apparatus may be configured to determine which of the first and second function instance to run upon receipt of the at least one request.

The apparatus may be configured to receive a plurality of requests from at least one first function instance in a first time period and determine which of the at least one first function instance and second function instance to run at the end of the first time period.

The apparatus may comprise be configured to store at least one of operational stage information and priority information for a function instance in at least one of the function instance, a database storage function and a coordination function.

The apparatus may be configured to continue the determined function instance to an output operation stage.

In a fourth embodiment there is provided a self-organising network system comprising a network management entity and a network element, the network management entity configured to receive a request message from a first function instance of a self-organising network, the request message comprising at least one request from the first function instance, compare said first function instance and a second function instance effective in the self-organising network to determine if the first function instance and the second function instance overlap, and, characterised in that, the network management entity is configured to receive operational stage information of the first function instance and if the first function instance and the second function instance overlap, use said operational stage information in determining which of the first and second function instance to run in dependence on which of the first function instance and the second function instance has higher priority and cause an execution message to be sent to the network element to cause the network element to run the determined instance.

The system may allow specific communication between a coordination function and function instances. This may make it possible for a network management entity to manage the function instances of network elements from different operators/vendors.

The network management entity may comprise at least one of a network manager and an element manager.

The network element may comprise at least one of a base station, a network controller and a serving support node.

At least one of the request and execution message may be sent over a standardized interface.

At least one of the request and execution message may comprise a state information element.

The network management entity may comprise a self-organizing network function coordinator.

The self-organizing network function coordinator may comprise a database storage function, the database storage function configured to operational stage information and priority information for a function instance.

The network management entity may be configured to receive operational stage information from at least one of the function coordinator, the database storage function or the function instance.

In a fifth embodiment there is provided a computer program comprising computer executable instructions which when run on one or more processors perform the method of the first embodiment.

In the above, many different embodiments have been described. It should be appreciated that further embodiments may be provided by the combination of any two or more of the embodiments described above.

DESCRIPTION OF FIGURES

FIG. 8 shows an example of the SON Coordination of different SON Function Instances using absolute priorities;

DETAILED DESCRIPTION OF EMBODIMENTS

Before explaining in detail the examples, certain general principles of a wireless communication system and mobile communication devices are briefly explained with reference to FIGS. 1 to 2 to assist in understanding the technology underlying the described examples.

In a communication system a user can be provided with a mobile communication device that can be used for accessing various services and/or applications. The access can be provided via an access interface between the mobile communication device and an appropriate wireless access system of a communication system comprising an access node. An access node or network entity (NE) can be provided by a base station. The term base station will be used in the following and is intended to include the use of any of these network access nodes or any other suitable network entity. In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 1:
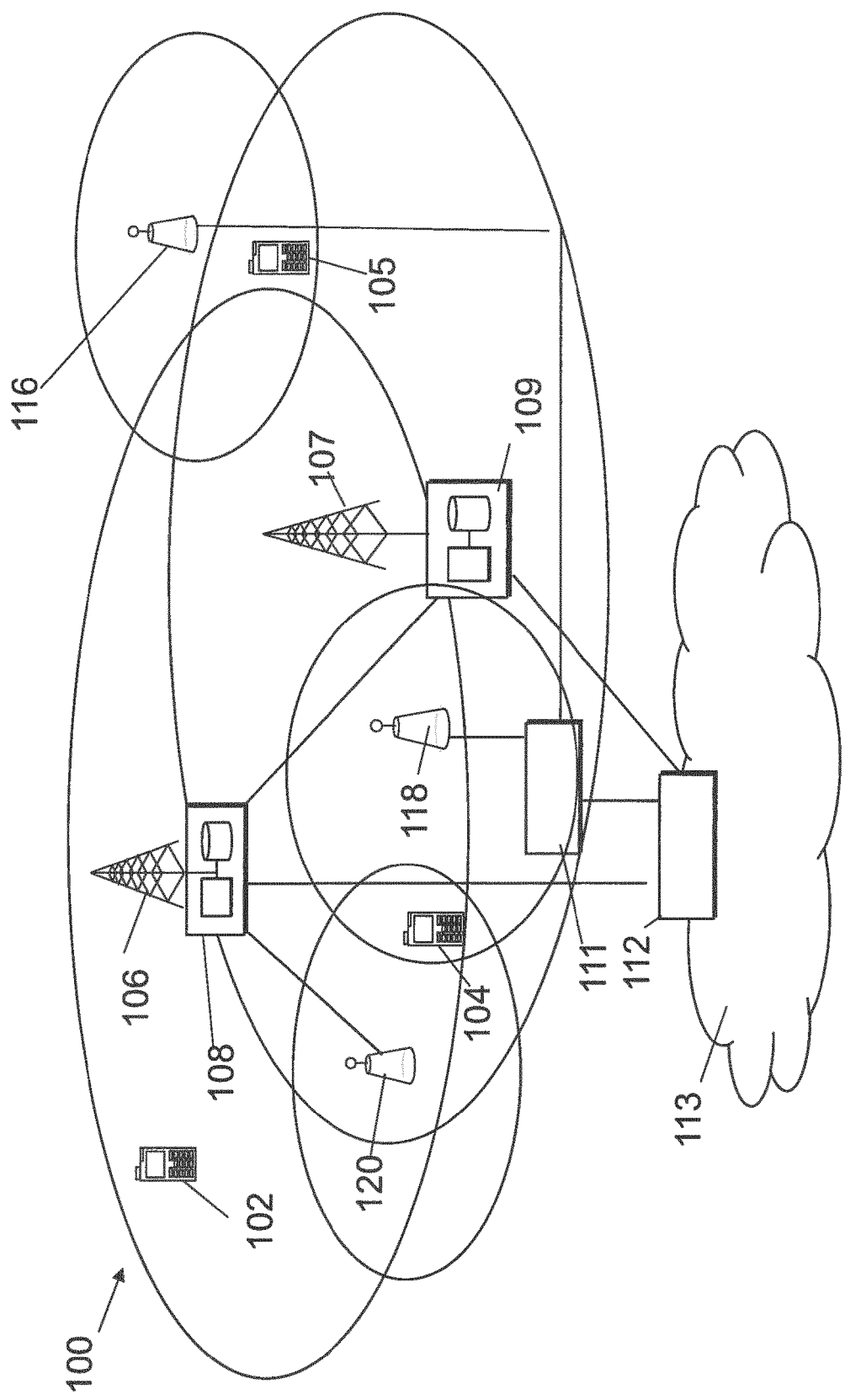
FIG. 1 shows a schematic diagram of an example communication system comprising a base station and a plurality of communication devices.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
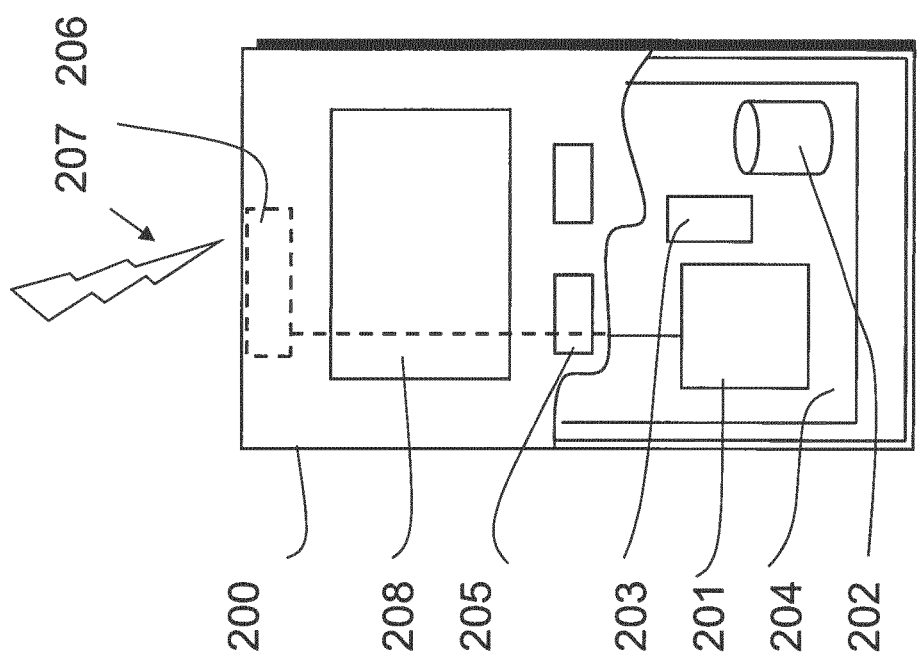
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

The following relates to self organising networks (SON). SON functionality and behaviour is defined for different network architecture and releases. A communication system 100 may comprises a self-organising network management entity (not shown). The self-organising network SON functions can be integrated into the automated operation administration and management (OAM) (Network Management) architecture and be communicated via the Itf-S (standardised) and Itf-N (non-standardised) interfaces. In some embodiments the SON functions may be physically integrated at a NE directly (this is a so-called distributed approach), and/or they can be integrated at the OAM system (this is a so-called centralized approach).

The various nodes and functions discussed in embodiments further below may be provided by an apparatus of the type shown in FIG. 3. This apparatus may be used to provide one or more of a: base station of any kind; SON coordinator; OAM function etc. The term "base station" may refer to any type of base station, including but not limited to a macro-eNB and a micro-eNB. The term "micro-eNB" may be used interchangeably with small-cell-eNB, home-eNB, micro-eNB, femto-eNB etc. The controller apparatus 300 is typically provided with at least one memory 301, at least one data processor 302, 303 and at least one input/output interface 304. The apparatus of FIG. 3 may be a self-organising network management controller apparatus for the network entities. The control apparatus may comprise a coordination function layer. The control apparatus may be configured to execute appropriate software applications to provide the desired control functions. The control apparatus 300, can in some embodiments be provided in a node and comprising at least one memory and computer program code can be configured, with the at least one processor, to cause the node to communicate with other network entities to communicate control information. At least some of the processing blocks can in some embodiments be carried out by one or more processors in conjunction with one or more memories. The processing block may be provided by an integrated circuit or a chip set. The control apparatus can be interconnected with other control apparatuses.

Self-Organizing Networks (SON) allow for automated network management of some communication systems such as LTE or LTE-A, as well as for multi-radio technology networks known as heterogeneous networks (HetNet). SON may provide one or more of self-configuration, self-optimization and healing. Self-configuration deals with the auto-connectivity and initial configuration of new network elements such radio base stations. Self-optimization targets the optimal operation of the network. Self-optimization triggers one or more automatic actions where there is one or more of a change in demand for services, there is a change in user mobility and usual application usability changes, with the result that one or more network parameters need to be adjusted. Self-optimization may alternatively or additionally be used for one or more of energy saving and mobility robustness optimization. The SON may alternatively or additionally provide self-healing which may provide one or more of automatic anomaly detection and fault diagnosis. Areas related to SON may comprise one or more of Traffic Steering (TS) and Energy Savings Management (ESM).

SON aims at replacing conventional offline manual network operation and optimization processes (and associated tools). SON functions may provide individual use cases in one or more the areas mentioned above in an "online" distributed fashion. Instances of a certain SON function type may operate within a specific narrow scope on a relatively small part of data available at a network element or OAM (operation, administration and maintenance) system. SON functions may be supplied by one or more different vendors. One or more SON functions may be integrated within and for a specific network deployment.

A SON function may have a monitoring part that models one or more certain conditions. These one or more conditions may be filtered and/or detected from the input data. The input data may be for example performance data such as one or more of measurements, counters, and Key Performance Indicators. If the monitoring part detects one or more conditions in the input data, a configuration determination part triggered which attempts to determine a better configuration of the resources under consideration. The proposed configuration may be provided to one or more configuration deployment entities. The SON function may thus react to one or more detected conditions.

A SON function may have a generic function area associated therewith. The function area may comprise all network resources which may be manipulated by a SON function to achieve a desired goal.

By way of example function area may comprise at least one of a geographical area and a topological area. For a geographical area, the network resources may be for example a set of cells. For a topological area, the network resources may be for example a set of router interfaces.

SON function instances are the run-time instantiation of for example a specific part of a SON function. The SON function instances may act on network resources in a certain area at a certain time. This means that while the function area is generic, i.e., implies that a given type of function works, e.g., on two adjacent cells, the function instance area is a concrete instantiation of e.g. two specific cells with IDs X and Y being adjacent to each other.

SON function instances may have at least one of a spatial scope (e.g., set of cells, set of network interfaces) and a temporal scope (activity at certain times or time intervals). SON function instances may spontaneously become active (e.g., if the monitoring part detects a given condition in the input data) without any involvement by a human operator or a conventional OAM function. The SON function instances may run inside the OAM system and/or in a network element. The execution of SON functions may be individual and dynamic (i.e. not planned).

SON function instances may not have information going beyond the specific function type and specific instantiation. However, SON function instances may have run-time interactions with each other. A negative interaction is called a conflict. For example, one SON function instance may reduce an error in one part of the system but the correction provided may lead to a problem in a different part of the system.

Figure 4:
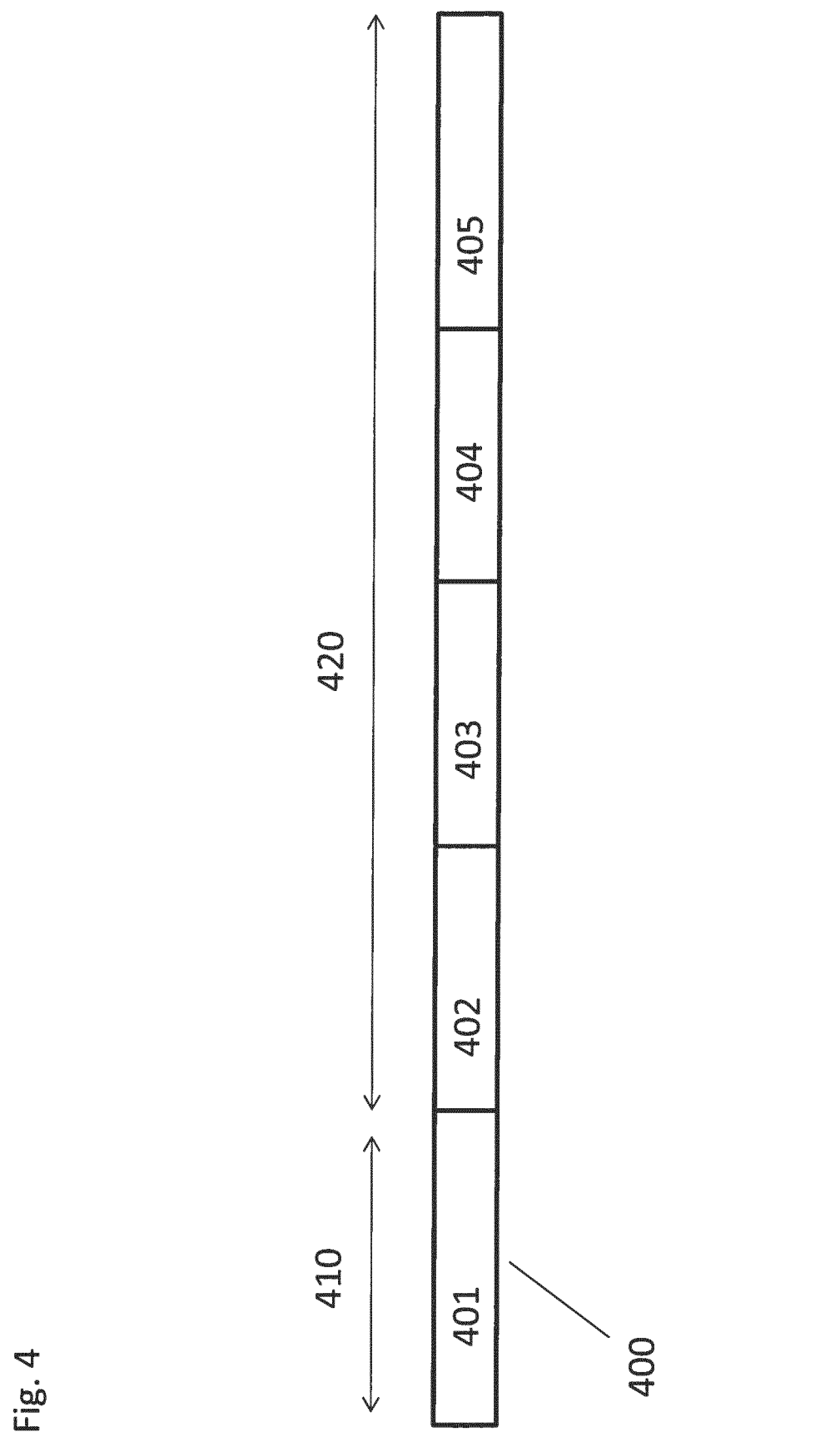
FIG. 4 shows an example of the timeline of typical SON Function Instance with different operational stages.

A function instance in a SON can be denoted with different operations time-wise. FIG. 4 shows example operations of a function instance 400 and the corresponding impacting time periods. For example, the instance needs to take input before it makes a decision on an action (i.e., the input operation 401 which may be defined as an Information Collection Period). When the input indicates that the instance needs to make a decision on an action, the instance will be "triggered" to make a decision (i.e., the decision making operation 402 which may be referred to as Execution Time). After the decision making indeed defines an action, the instance is "triggered" to enforce the action (i.e., the output operation 403, which may be referred to as Enforcement Time). After the action has been enforced, the function instance may take a configuration management (CM) verification operation in, but at the end of an output operation 404, which may be referred to as Visibility Delay, that provides information on the time required before the effects of the taken action are visible. The CM verification operation in Visibility Delay 404 may determine if the enforcement is acceptable or not. If not, a rollback of the enforcement operation 403 may be done. Otherwise, the function instance goes to another implicit operation 405, which may be referred to as a Relevance Interval that provides information on the time period the operator would like to keep and/or safeguard the effects of the function instance 400.

As shown in FIG. 4, the time consumed to stay in the operational stage of Information Collection Period 401 may be referred to as the input impact time 410 of the function instance 400. The time consumed to stay in the operational stages of Execution Time 402, Enforcement Time 403, Visibility Delay 404, and Relevance Interval 405 (or until the removal of the effects of the instance) may be referred to as the output impact time 420 of the function instance 400.

The impact range consists of Input Scope and Impact Area. An Input Scope may be defined as the scope on which a function instance collects (directly or indirectly) the needed inputs required for its correct execution, which can be the scope of specific information objects of a network entity or network entities (e.g., a UE's behavior, a cell's characteristics, a home subscriber server (HSS)/home location register (HLR) entry, an operations support system (OSS) record, etc.), where a network entity can be any one of a UE, a cell/access point, a cell pair, cell neighbors, a cell cluster, sub-network, and the network. An Impact Area may be defined as the scope in which an "output" action of a function instance would have its effect, which can be the specific information objects of a network entity or network entities (e.g., a UE's behavior, a cell's characteristics, a HSS/HLR entry, an OSS record, etc.), where a network entity can be any one of a UE, a cell, a cell pair, cell neighbors, a cell cluster, sub-network, and the network.

Since the introduction of self-organizing networks, potential conflicts between some of the self-organizing function instances have been identified. Certain priority based methods to resolve the conflicts have also been defined.

However, the priority that these methods use is the "absolute" priority for the function instance as a whole. Throughout its operation period, the instance has the same "absolute" priority. Using this instance-wide "absolute" priority may be problematic. For example, given the same "absolute" priority, an instance with longer impact time and/or bigger impact range may have more chance to enforce an action than an instance with shorter impact time and/or smaller impact range would. This dominance may become more significant as the impact time gets longer and/or the impact range gets bigger. There may be cases where some long/big impacting instances completely block certain short/small impacting instances enforcing their actions, even if they have the same instance-wide priority.

The priority (e.g., the importance/urgency) of an instance may change during the operation of the instance. For example, the information collection operation of an instance may be less important than the operation of the action enforcement of the same instance. After the operation of the actual action enforcement (e.g., configuration of the network) and Visibility Delay, the importance of the instance may drop because the problem has been/is being fixed by the instance.

Figure 5:
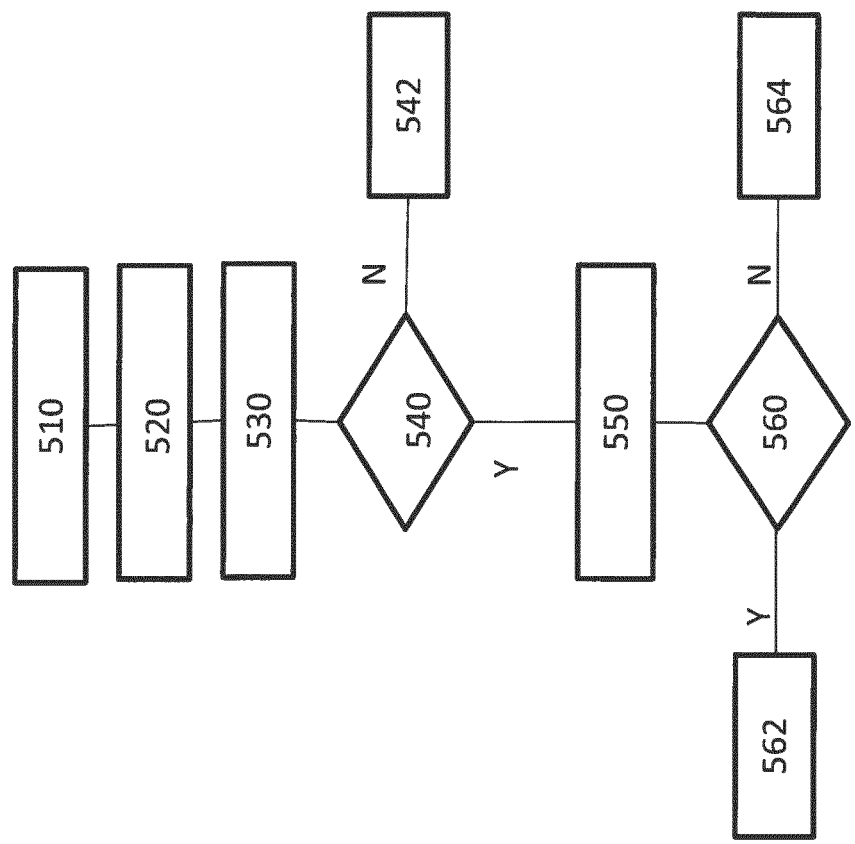
FIG. 5 shows a flowchart of an example method of operational priority based coordination of requests from function instances.

The method shown in the flowchart 500 of FIG. 5 is aimed at assigning different priority values to different operations of a function instance and to coordinate them based on the different priority values of function instances in the different operations. In addition to coupling a specific priority with a specific operation, this method may reduce dominance of those instances with long/big impacts. The method of FIG. 5 comprises, at 510, receiving at least one request from a first function instance of a self-organising network, at 520, receiving operational stage information of the first function instance. At step 530, the method may comprise comparing said first function instance and a second function instance effective in the self-organising network to determine if they overlap and, if so 540, at step 550, using said operational stage information in determining which of the first and second function instance to run in dependence on which of the first function instance and the second function instance has higher priority and, accordingly 560, at step 562 cause the first instance to run or at step 564, cause the second instance to run. Determining if said first and second function instances overlap may comprise determining if output impact time and impact area of the first function instance, or the input impact time and input scope if the request is for input collection, overlaps with output impact time and impact area of the second function instance.

The relative priorities of the first and second function instance may be determined in dependence on the operational stage information of the instance, for example, if the function instance is in an input collection stage, and/or on an effective priority for the operational stage of an instance.

Figure 6:
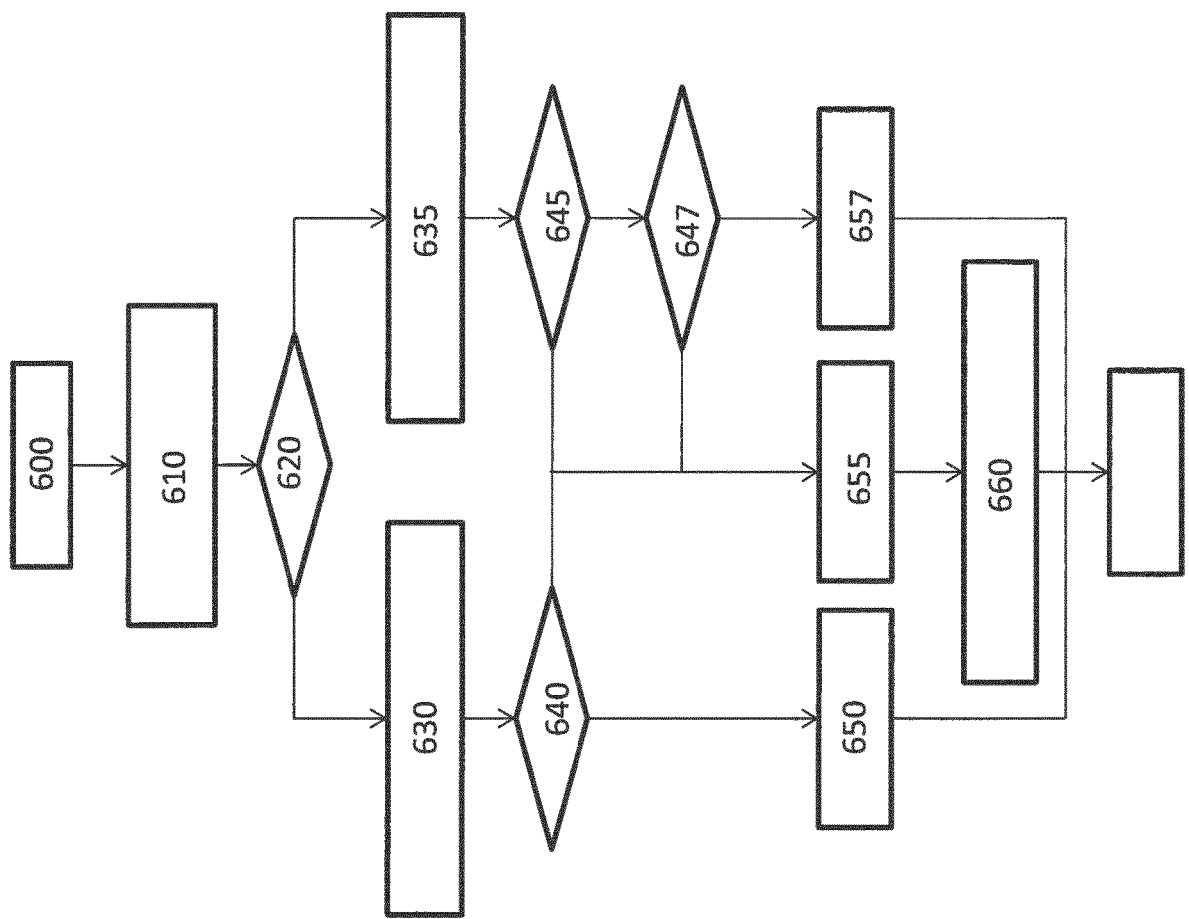
FIG. 6 shows a flowchart of an example operational priority based coordination function for requests from function instances.

FIG. 6 shows a flowchart 600 of a coordination function which may be used to perform the method described in relation to FIG. 5. The coordination function as shown in FIG. 6 reviews an individual request from a function instance and rejects or approves the individual request according to the effective priority and operational stage of its instance as well as other function instances still effective in the system. In a first step 610, the coordination function takes a request from the front of a request queue. The function determines, at step 620, if the request is for input collection. If so, the function continues to step 630 and checks if the input impact time and the input scope of the function instance making the request overlaps with the output impact time and the impact area of any still-effective function instance in the system. If they overlap 640, the method moves to step 650 and rejects the instance of the request. If they do not overlap, the method moves to step 655 and accepts the request of the instance.

If, at step 620, the request is not for input collection, the method moves to step 635 and checks if the output impact time and the impact area of the function instance making the request overlaps with the output impact time and the impact area of any still-effective function instance in the system. If they overlap, 645, the method checks at step 647 if the instance of the request has a higher effective priority. If so, the method moves to step 655 and accepts the request of the instance. If the function instance making the request does not have higher priority, the method moves to step 657 and rejects the request.

If, at step 655, the request of the function instance is accepted, the method updates the operational stage of the instance at step 660.

A method such as that of FIG. 5 or 6 may operate in event mode where it makes a decision (to reject or approve a request from a function instance) whenever it receives a request from a function instance. Alternatively, or in addition, the method can also work in batch mode where it collects certain amount of requests or the requests (if any) in certain period of time from function instances, before it makes the individual decisions (reject or approval) for them.

As shown in FIG. 6, once the coordination function receives a request from a function instance, the function determines whether the request is for input collection.

In "cell-level KPI (Key performance indicator) profiling," cell level performance is monitored over a long period of time continuously. The profiling is typically based on analysis of PM data from several weeks. Once a new SON instance is created (e.g. by the Operator via an iSON Manager graphical user interface (GUI)), the KPI data needed as input for the function instance is available in a similar way as it is for every other previously activated/running SON instance.

However, the reliability of the KPI data taken as input to the usually consecutive SON operations could be reduced by earlier executed SON operations which may have caused changes to the PM data. If there is only a short time between the triggering of two consecutive SON Function Instances, it may happen that the change in the PM caused by the earlier instance is not yet visible (i.e. not enough measurement samples are available). Thus, if an instance is triggered soon after the completion of an earlier one, the latter instance may take "old" KPI data as an input and, as a consequence some of the latter instance's SON operations may be triggered based on unreliable data. It is desirable to avoid triggering of new SON Function Instances based on unreliable or inconstant PM data collected during the Input Collection Period.

A solution defines a "guard time" or "visibility delay plus relevance interval". The duration of the guard time may be defined in at least three ways; a SON Operation specific recommended or default numerical value, end user editable value via settings panel in GUI and/or duration based on reaching statistical reliability i.e. measurement samples will be collected as long as the statistical reliability has been reached. Definition for the statistical reliability (i.e. necessary number of samples) needs to be set by the end user via the settings panel in GUI.

During the guard time, SON Coordinator prevents other SON Function Instances (with same or lower priority within the overlapping Impact Area) from running.

In an alternative method, a duration is set for the Input Collection Period. The duration of time may be set in which the system prevents or blocks other SON Function Instances from running within the Input Scope of the instance. The duration may be set by a timer (via settings panel in GUI). The duration may have the length of the Input Collection Period. The duration may be defined differently for each SON Function Instance by the operator. The duration may be shorter than the guard time of the last run SON Operation.

That is, as shown in the method of FIG. 6, determining if the first and second function overlap may comprise, if the request is for input collection, determining if the input impact time and scope of the first function instance overlaps with the output impact time and impact area of the second function instance. If so, then the second instance function instance has higher priority. If the input impact time and the input scope of the instance making the request overlap with the output impact time and the impact area of any still effective function instance in the system, then the request is rejected. In this case, the second function instance is allowed to run. If there is no overlap, both first and second function instances may be allowed to run.

Determining if the first and second function overlap may comprise, if the request is for an operation other than input collection, determining if the output impact time and the impact area of the instance making the request overlap with the output impact time and the impact area of any still effective, or second, function instance in the system. In this case, determining which of the first or second function instances has higher priority may comprise comparing the effective priority of the instance making the request and the effective priority of the second function instance. If the instance of the request has a higher priority, then the request is accepted and first function instance is allowed to run. The second function instance is prevented from running. If the instance has a lower priority, the request is rejected and the second function instance is allowed to run.

Allowing a function instance to run may be defined as allowing that function instance to continue to the operation stages of its output impact time.

Assigning an effective priority value to an operational stage of a function instance may comprise determining a priority value for an operational stage of a function instance in dependence on the absolute priority value for the function instance. Table 1 shows an example of effective priority assignment for the different operations of such a function instance. A non-iterative function instance may have different importance/urgency at different points of its impacting time. Here, the operations are defined according to the different operational stages of a function instance as shown in FIG. 4. In general, the same principle can be applied to assign effective priorities to any time-wised operations defined for a function instance.

Table 1 shows an example of different priority assignments for a function instance, given the function's "absolute" priority value has been set as X originally by an operator. In this example, the priority is numerically defined as the lower the priority value is, the higher the priority of the function instance.

TABLE 1

| Operation Priority | Input Collection Period | Execution Time | Enforcement Time | Visibility Delay | Relevance Interval |
|---|---|---|---|---|---|
| Priority Deviation | 1 | 0 | 0 | −1 | 2 |
| Effective Priority | X + 1 | X | X | X − 1 | X + 2 |

A function instance with multiple iterations may have different importance/urgency at its different iterations, too. An iterative function instance can be understood as a series of consecutively operated (sub) instances. Each of its (sub) instances is identified with its instance identity and the iteration round i and, the (sub) instance can request for an action with the approach defined above. Each of the (sub) instances can be assigned with the operation-based effective priorities, e.g., as shown in Table 1, but by multiplying these effective priorities with iteration factor related to its iteration round. This iteration factor can be in principle a function a(i) of iteration i, where a( ) can have any real/integer value and i=1 . . . n. For example, the effective priorities for the (sub) instance of iterative i can be as shown in Table 2.

Table 2 shows priority assignments for a function (sub) instance of iteration i, given the function's "absolute" priority value has been set as X originally by an operator. In this example, the priority is numerically defined as the lower the priority value is, the higher the priority of the function (sub) instance.

TABLE 2

| Operation Priority | Input Collection Period | Execution Time | Enforcement Time | Visibility Delay | Relevance Interval |
|---|---|---|---|---|---|
| Priority Deviation | 1 | 0 | 0 | −1 | 2 |
| Effective Priority of iteration i | $\alpha(i) * (X + 1)$ | $\alpha(i) * X$ | $\alpha(i) * X$ | $\alpha(i) * (X - 1)$ | $\alpha(i) * (X + 2)$ |

Figure 7B:
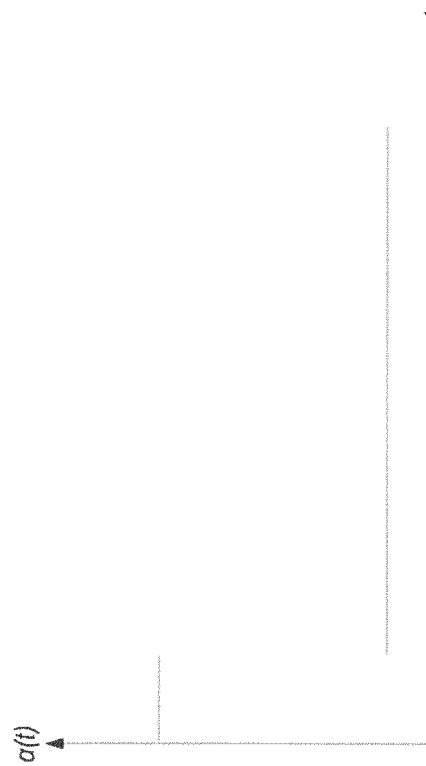
FIG. 7b shows an alternative example function instance coefficient that further modifies the effective priority of an instance according to its time of operations.
Figure 7A:
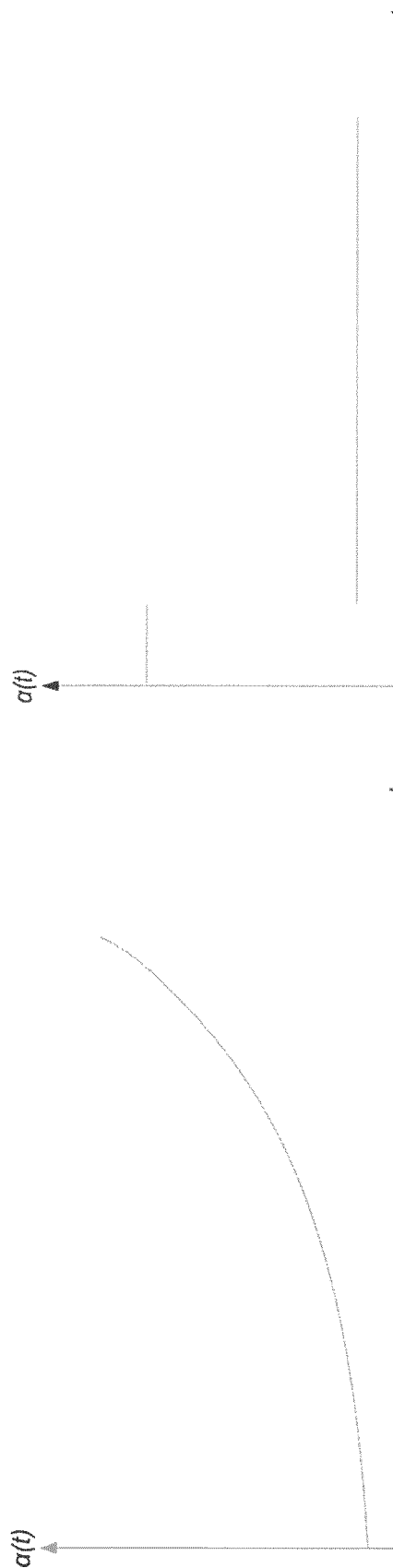
FIG. 7a shows an example function instance coefficient that further modifies the effective priority of an instance according to its time of operations.

FIGS. 7a and 7b show examples of function instances which may have different importance urgency at different iterations.

For example, the earlier iterations of a coverage and capacity optimization (CCO) function instance may be more important/urgent than its later iterations. This may be because a major part of the coverage/capacity problem should have been addressed by the earlier iterations of the CCO function instance. This differentiation can be achieved by using, for example, the specific a(t) shown in FIG. 7a. The increasing a value leads to the gradual drop of the effective priorities of the function instance.

On the other hand, the early period of an energy saving function instance may be less important/urgent than its late period. This may be because "going into energy saving" is less important/urgent than "leaving energy saving", as the main purpose of an operator is to serve its users. This differentiation can be achieved by using, for example, the specific a(t) shown in FIG. 7b. The discrete drop of a value leads to the significant increase of the effective priorities of the function instance at certain point of time.

When a request of a function instance is approved, the coordination function and/or the function instance itself may update the operational stage information as described herein. The updated operational stage information of the instance may be stored in the instance, in a database storage function, and/or in this coordination function. The coordination function can then get this information when needed.

When requesting for the approval of an intended operation, a function instance may indicate or make available its current operational stage and/or the effective priority of the current operational stage, if not available to the approver. For example, if the function instance requests for the operation of an actual configuration, it indicates its current operational stage "Execution Time" and its absolute priority X. The absolute priority value may be obtained from a database storage function, if pre-configured there. An effective priority for an operational stage may be determined from the absolute priority, for example as defined in table 1 and/or 2. If a request is approved, the function's current operational stage will be changed into "Enforcement Time" immediately. The same applies to the operational stage of "Input Collection Period." Here, if a request to start the input collection operation is approved, it means also the operational stage of the function instance becomes "Input Collection Period." If a request to start the decision making operation is approved, it means also the operational stage of the function instance becomes "Execution Time" from the operational stage "Input Collection Period."

However, the operational stages of "Enforcement Time", "Visibility Delay", and "Relevance Interval" are different because they are implicit. Here, there may be no indication from the function instance and, the instance may have even been removed already at the time. They are the function instance operational stages denoting the still existing impact time period of the actual action taken by the function instance, even after the function instance may have been removed.

The stage transition from "Enforcement Time" stage to "Visibility Delay" stage may be taken based on the estimated period length of "Enforcement Time" stage. For example, a timer could be started by a function (e.g., the coordination function) when the function instance enters its "Enforcement Time" stage. The stage transition from "Enforcement Time" stage to "Visibility Delay" stage can take place when the timer of the "Enforcement Time" stage expires. The stage transition from "Enforcement Time" stage to "Visibility Delay" stage may also be made following an instruction from the system. With the same principle, the stage transition from "Relevance Interval" stage to the end of the complete impact of the function instance may be taken based on the estimated period length of "Relevance Interval" stage. Likewise, the transition from the "Relevance Interval" stage to the end of the complete impact of the function instance can be triggered by the expiration of a timer set for "Relevance Interval" stage.

The stage transition from "Visibility Delay" stage to "Relevance Interval" stage may be different if a CM verification "function" is used to assess the taken CM action and define the next operation. The CM verification "function" may start to monitor the network information (e.g., the performance) when the CM verification "function" considers that the CM action of the function instance has started to show its effect. After the CM verification "function" has collected enough its needed information, it may make an assessment on the CM action. The verification function may then instruct, for example, the stage transition from "Visibility Delay" stage to "Relevance Interval" stage or a rollback of the taken CM action.

If there is no such CM verification "function" to make the assessment on the taken CM action, the stage transition from "Visibility Delay" stage to "Relevance Interval" stage may be taken based on the estimated period length of "Visibility Delay" stage. Again, for example, a timer could be started by a function (e.g., the coordination function) when the function instance enters its "Visibility Delay" stage. The stage transition from "Visibility Delay" stage to "Relevance Interval" stage can take place when the timer for "Visibility Delay" stage expires.

Here, the three period-length values for stage "Enforcement Time", stage "Visibility Delay", and stage "Relevance Interval" may be configured for each function instance. Their information can be stored in a database storage function. A coordination function such as that shown in FIG. 5 may obtain this information from this database function when needed. When an instance is just started, it may start from its Information Collection Period stage or directly from its Execution stage. When starting from its Information Collection Period stage, the instance requests for its input collection operation in Input Collection Period stage, which is sent to the coordination function. The request provides its current operational stage as "Pre-Operation." When the coordination function approves this request, the coordination function and the instance record the current operational stage of this instance as "Input Collection Period" stage. After the collected information is enough to make a decision, the instance requests for the decision making operation for its next "Execution Time" stage. The request may provide its current operational stage as "Input Collection Period." When the coordination function approves this request, the coordination function and the instance record the current operational stage of this instance as "Execution Time" stage.

A CM Assessment Cycle may be one of the analytical processes executed during a Visibility Delay. The CM Assessment Cycle or "CM Verification" may take place in, but at the end of, the Visibility Delay. The CM Assessment Cycle may synchronized with the PM (e.g. hourly) granularity and can be used to assess if the CM change (SON Operation) has caused a negative, no change or positive impact on the performance management (PM) data. In the case that the impact is negative, it may be undesirable to run SON operation(s) as planned since an outcome may be that the previous SON operation (with negative impact) will have to be withdrawn or other instances would be invoked to operate instead. To achieve this, the system needs an indication at the end of the Visibility Delay period of the instance. After receiving the indication then, the system can roll back the former CM action of the instance or trigger the next consecutive predefined SON Operation (e.g. CCO has changed cell borderline and degraded the HO performance—instead of rolling back, a new SON Operation (AAO) can be triggered to optimize adjacencies (create new/delete unnecessary) with a target to improve the HO performance). This is called SON Operation chaining and it can be managed by the operator via the GUI. Likewise, a no-change or positive impact on the PM may be indicated to the system as well. Therefore, the method may comprise indicating to the system that the visibility delay period of an instance is over. The indication may comprise the following information elements; assessment result (e.g. "positive", "negative", or "no change") and/or an operation proposal ("keep the original plan", "rollback of the operation", "invoke a specific instance for further operation", etc.

The operation-based priority setting and coordination can bring multiple operational advantages.

FIG. 8 shows a timing diagram of the impact time instances of function instances A and X in time. In FIG. 8 there is shown an example in which a less impacting instance, instance A, having an input impact time 810a and an output impact time 820a caused by trigger 830, may be dominated by a more impacting instance, instance X having an input impact time 810x and an output impact time 820x caused by trigger 830. Such a less impacting instance may be a SON/TS operation including a traffic steering (TS) function/an iterative SON functions (e.g., coverage and capacity optimization (CCO)). As shown in FIG. 8, Instance X would originally work by inputting continuously and taking action when needed. That is the input impact time 810x, and output impact time 820x if a trigger 830 is determined, of instance X are continuously effective in the system. Instance A would originally work as an event-driven instance that takes input/output when needed. Instance X and Instance A could impact each other. If Instance X has the same priority as Instance A, there is a case where Instance A would never get a chance to work, if an instance-wide "absolute" priority is used for conflict coordination. The more impacting instance X may block the work of the less impacting instance A.

Figure 9:
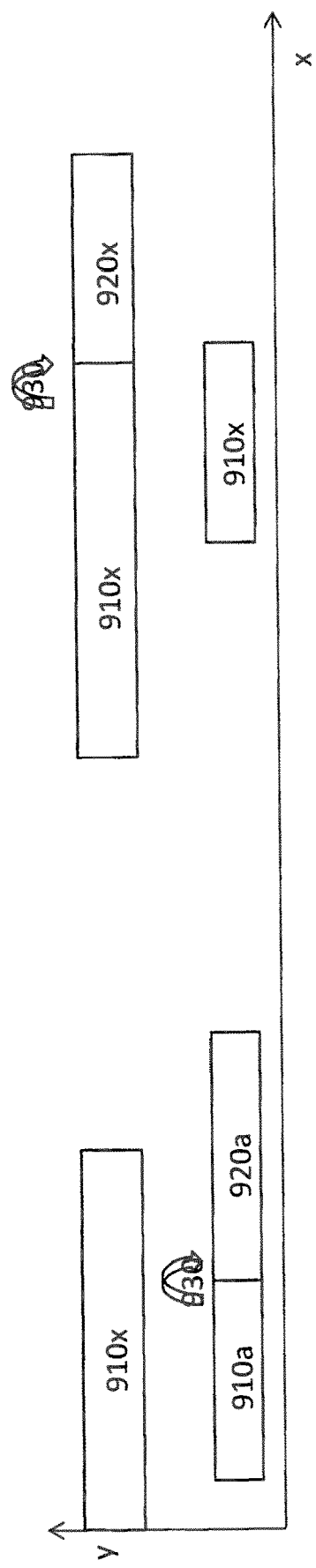
FIG. 9 shows an example of the SON Coordination of different SON Function Instances using effective priorities.

FIG. 9 shows a timing diagram of the impact time instances of function instances A and X in time. Function instance A has an input impact time 910a and an output impact time 920a caused by trigger 930. Function instance X has an input impact time 910x and an output impact time 920x caused by trigger 930. FIG. 9 shows an example result on both instance X and A when using the effective priorities and the corresponding coordination proposed. Both Instance X and A can be run in parallel when they take inputs, i.e. during the respective input impact time 910x and 910a. When Instance A is having an output action, the later coming but overlapping input collection period 910x of Instance X may be "rejected." After the output impact time 920a of Instance A is over, a new input collection period 910x of Instance X can start by the request of Instance X, which may lead to the output action 920x taken by Instance X. In this case, the later coming but overlapping output attempt 920a of Instance A is "rejected." As the result, both instances have the chance to work.

It should be understood that each block of the flowchart of FIGS. 5 and 6 and any combination thereof may be implemented by various means or their combinations, such as hardware, software, firmware, one or more processors and/or circuitry.

Figure 3:
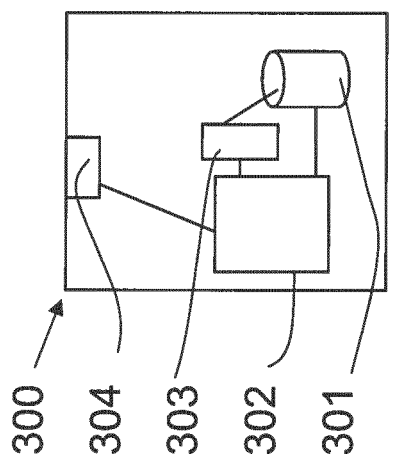
FIG. 3 shows a schematic diagram of an example control apparatus.

The method of FIG. 5, or coordination function of FIG. 6, may be implemented in an apparatus such as that shown in FIG. 3. For example, the coordination function may be carried out in a control apparatus of a network management entity and/or a base station. The determination may, in some embodiments, be made at a node other than a network management entity and/or a base station. For example the determination may be made at the OAM, with the instruction for load distribution then being transmitted to each base station. The determination may also take place at a network node other than the OAM. For example implementation may be carried out in the NMS (Network Management System), or the EMS (Element Management System), or a separate SON server.

Figure 10:
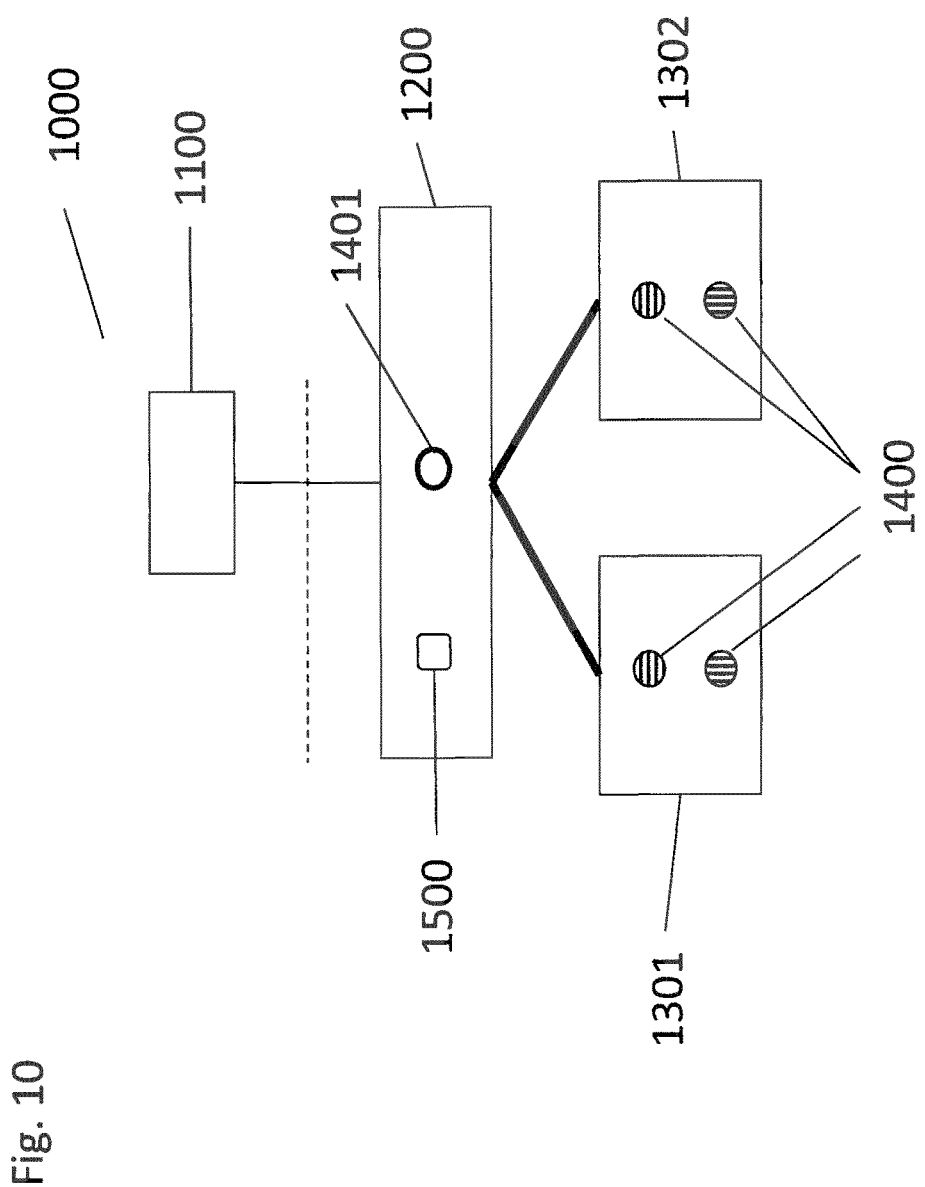
FIG. 10 shows an example of a SON system.

FIG. 10 shows an example of a system in which a method such as that of FIGS. 5 and 6 may be implemented. The system may comprises network management entities such as network manager (NM) 1100 and entity manager (EM) 1200. In this example, the interface between NM 1100 and EM 1200 is itf-N, a standardized interface by 3GPP. The interface between NM 1100 and the EM 1200 may be a non-standardised interface. Some SON functions 1400 may be executed logically in a base station such as base stations 1301 and 1302. Alternatively, or in addition, some SON functions 1401 may executed logically in network management entities such as EM 1200 and/or NM 1100. A SON coordination function 1500, which may perform a method such as that of FIG. 5 or FIG. 6 may logically run in EM 1200, while alternatively or in addition, another SON coordination function may be run in NM 1100. The two SON coordination functions may communicate over itf-N. The SON coordination function 1500 may receive requests from its coordinated SON functions, e.g. the SON coordination function in EM may receive requests from SON functions 1400 of the base stations 1301 and 1302, and coordinate them by responding accordingly.

OSSii (OSS interoperability initiative) make it possible for an EM 1200, and/or NM 1100 if extended to itf-N, to manage the base stations 1301 and 1302 and the SON functions from different vendors and for an operator to manage functions of different vendors through EM 1200 (and/or NM 1100) manually. That is an "OSSii"-like interface allows specific communication between SON functions such as functions 1400 and 1401, and a coordination function 1500. The SON "OSSii"-like interface allows the specific manual management of the SON functions by a user through EM 1100 (and/or NM 1200).

It should be understood that the control apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE/LTE-A, similar principles can be applied in relation to other networks and to any other communication system where self-organising networks are used. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving at least one request from a first function instance of a self-organizing network;
comparing said first function instance and a second function instance effective in the self-organizing network to determine whether the first function instance and the second function instance overlap;
receiving operational stage information of the first function instance and, if the first function instance and the second function instance overlap, using said operational stage information in determining which of the first and second function instance to run in dependence on which of the first function instance and the second function instance has higher priority; and
causing the determined instance to be run.

2. The method according to claim 1, further comprising using said operational stage information to determine whether said request is for an input operation stage.

3. The method according to claim 2, further comprising, if the request is for an input operation stage, determining if input impact time and scope of the first function instance and output impact time and impact area of the second function instance overlap.

4. The method according to claim 3, further comprising, determining that the first function instance has lower priority than the second function instance if the input impact time and scope of the first function instance overlaps with the output impact time and impact area of the ongoing function instance.

5. The method according to claim 1, further comprising, if the request is not for input collection, comparing said first and second function instance to determine if the first function instance and second function instance overlap comprises determining if output impact time and impact area of the first function instance and output impact time and impact area of the second function instance overlap.

6. The method according to claim 1, further comprising comparing an effective priority for the operational stage of the first function instance and an effective priority for the operational stage of the second function instance.

7. The method according to claim 6, wherein effective priority is dependent on absolute priority for the function instance.

8. The method according to claim 1, wherein running a function instance further comprises updating operational stage information.

9. The method according to claim 8, further comprising updating operational stage information after a predetermined time period.

10. The method according to claim 8, further comprising receiving configuration management information and updating operational stage information upon receipt of said configuration management information.

11. The method according to claim 10, wherein said configuration management information comprises at least one of a verification result and an operational proposal.

12. The method according to claim 1, further comprising determining which of the first and second function instance to run upon receipt of the at least one request.

13. The method according to claim 1, further comprising receiving a plurality of requests from at least one first function instance in a first time period and determining which of the at least one first function instance and second function instance to run at the end of the first time period.

14. The method according to claim 1, further comprising storing at least one of operational stage information and priority information for a function instance in at least one of the function instance, a database storage function, and a coordination function.

15. The method according to claim 1, wherein running the determined function instance further comprises running the determined function instance to an output operation stage.

16. A computer program embodied on a non-transitory computer-readable medium, said program comprising computer executable instructions which when run on one or more processors perform the method of claim 1.

17. A self-organizing network system comprising a network management entity and a network element, the network management entity configured to:
receive a request message from a first function instance of a self-organising network, the request message comprising at least one request from the first function instance;
compare said first function instance and a second function instance effective in the self-organizing network to determine if the first function instance and the second function instance overlap;
receive operational stage information of the first function instance and, if the first function instance and the second function instance overlap, use said operational stage information in determining which of the first and second function instance to run in dependence on which of the first function instance and the second function instance has higher priority; and
cause an execution message to be sent to the network element to cause the network element to run the determined instance.

18. The system according to claim 17, wherein the network management entity comprises at least one of a network manager and an element manager.

19. The system according to claim 17, wherein the network element comprises at least one of a base station, a network controller, and a serving support node.

20. The system according to claim 17, wherein at least one of the request and execution message is sent over a standardized interface.

21. The system according to claim 17, wherein at least one of the request and execution message comprises a state information element.

22. The system according to claim 17, wherein the network management entity comprises a self-organizing network function coordinator.

23. The system according to claim 22, wherein the self-organizing network function coordinator comprises a database storage function, the database storage function configured to store operational stage information and priority information for a function instance.

24. The system according to claim 22, wherein the network management entity is configured to receive operational stage information from at least one of the function coordinator, the database storage function, and the function instance.

* * * * *